United States Patent Office 3,646,217
Patented Feb. 29, 1972

---

3,646,217
ALKANONE MANUFACTURE
Richard D. Smetana, Beacon, N.Y., assignor to
Texaco Inc., New York, N.Y.
No Drawing. Filed Mar. 26, 1968, Ser. No. 716,234
Int. Cl. C07c 49/02
U.S. Cl. 260—593 R  5 Claims

ABSTRACT OF THE DISCLOSURE

A method of preparing an alkanone comprising contacting a secondary alkyl halide with alkali metal fluoride in the presence of dimethyl sulfoxide at a temperature less than 140° C., preferably under anhydrous conditions and in the presence of an oxygen containing gas.

BACKGROUND OF INVENTION

Field of invention

The subject invention pertains to the field of art relating to the preparation of ketones which are acyclic in nature.

Description of the prior art

In the past, one of the methods employed in the manufacture of ketones was a vapor phase process calling for contacting a carboxylic acid at relatively high temperatures, e.g., 300° C. or more in the presence of catalyst, e.g., MnO. Although this method produced ketones in satisfactory quantities, it has the disadvantage of requiring a relatively high reaction temperature.

SUMMARY OF THE INVENTION

I have discovered, and this constitutes my invention, a method of preparing alkanones of 3 to 40 carbons from sec-alkyl halides under relatively reduced temperatures. More particularly, the invention relates to the discovery that sec-alkyl halide can be readily converted to alkanone by contacting a sec-alkyl halide with alkali metal fluoride in the presence of dimethyl sulfoxide at a temperature less than 140° C. under particular ingredient and quantity conditions and wherein water is present in a ratio of 0 to 0.5 mole water per mole dimethyl sulfoxide. Further, the reaction is preferably conducted in the presence of an oxygen containing gas.

DETAILED DESCRIPTION OF THE INVENTION

Specifically, the invention comprises contacting a sec-alkyl halide of the formula RX where R is secondary alkyl from 3 to 40 carbons and X is a halogen atom selected from the group consisting of Cl, Br and I with an inorganic salt selected from alkali metal fluoride in the presence of dimethyl sulfoxide (DMSO) at a temperature between 25 and 140° C., preferably between 100 and 140° C., utilizing a mole ratio of dimethyl sulfoxide to alkyl halide of between about 20:1 and 1:1, preferably between about 15:1 and 5:1, and inorganic salt to alkyl halide mole ratio of between about 5:1 and 1:1, preferably between 2:1 and 1:1. Under preferred conditions, the reaction is conducted under essentially anhydorus conditions. Under less preferred conditions, water may be employed but only in amounts wherein the mole ratio of water to dimethylsulfoxide is less than 1:2.

The reaction period is dependent on ingredients, temperature and reaction mixture concentration, but is normally in the range of between about 1 and 120 hours. The reaction is generally conducted at atmospheric pressure but subatmospheric and super-atmospheric pressures, e.g., up to 100 atmospheres can be utilized. The reaction is normally conducted under conditions of agitation, e.g., such as stirring to enhance the contact of the reaction ingredients.

Under most preferred conditions, an oxygen containing gas is introduced through the reaction mixture during the contact of the alkyl halide with dimethyl sulfoxide and inorganic metal salt. Apparently the oxygen containing gas increases the selectivity of the reaction towards the production of ketone and as a result enhances yield of ketonic product. The oxygen containing gas is normally employed in a mole ratio of oxygen to alkyl halide of between about 100:1 and 1:1, preferably between about 50:1 and 20:1. Examples of oxygen containing gases are air and mixtures of oxygen with inert gas such as nitrogen as well as pure oxygen itself.

The $C_3$ to $C_{40}$ alkanone product is separated from the reaction mixture via standard means, e.g., distillation preceded by separation via extraction. Typical solvents which selectively remove the unreacted halide and products from dimethyl sulfoxide and water are ethyl ether, pentane, heptane, chloroform and carbon tetrachloride.

In the method of the invention there are several critical aspects. Firstly, the use of dimethyl sulfoxide is essential for the production of alkanone. When the reaction solvents such as n-butanol, n-propanol, N,N-dimethylformamide and N,N-dimethyllauramide are substituted for the dimethyl sulfoxide under the conditions of the method of the invention, no measurable amount of ketones are produced. Secondly, mole ratios of water to dimethyl sulfoxide of greater than 1:2 favor the production of alkanol rather than the desired alkanone. Thirdly in the absence of metal salt as defined ketone is not formed. Further, reaction temperatures outside the defined range do not favor the production of alkanones.

Examples of the alkyl halides contemplated herein are 2-bromopropane, 2-chlorooctane, mixed sec-monochlorododecanes, 8-chlorooctadecane and 10-chloroeicosane.

Specific examples of the metal salts contemplated herein are sodium fluoride and potassium fluoride.

Examples of alkanone product produced by the method of the invention are 2-propanone, 2-octaonone, mixed dodecanones, 8-octadecanone and 10-eicosanone.

The following examples further illustrate the method of the invention but are not to be construed as limitations thereof.

EXAMPLE I

All ingredients were charged to a one-necked, 200 ml. flask fitted with a magnetic stirrer and thermowell containing a thermometer and water condenser connected to a calcium chloride drying tube before heat was supplied. Time zero was measured from the initial reflux or time of arrival at the required temperature in case of no reflux. Stirring was continued during the entire reaction. The alkanone product was analyzed via gas chromatography.

Utilizing the foregoing procedure five runs were made.
The test data and results of the several runs are reported below in Table I:

TABLE I

| Run | A | B | C | D | E |
|---|---|---|---|---|---|
| Ingredients, moles: | | | | | |
| DMSO | 1.41 | 0.71 | 0.71 | 1.41 | 0.71 |
| H$_2$O | 0.56 | 0 | 0 | 0.56 | 0 |
| 2-chlorooctane | 0.06 | 0.06 | 0.06 | 0.06 | 0.06 |
| NaHCO$_3$ | 0.06 | 0.06 | 0.06 | | 0.06 |
| KF | | | | 0.10 | |
| Air | | | 1.55 | | |
| N$_2$ | | | | 8.3 | |
| Conditions: | | | | | |
| Temperature, °C | 128 | 125 | 123 | 125 | 124 |
| Reaction time, hours | 46 | 18 | 96 | 71 | 44 |
| Product yield, mole percent | | | | | |
| 2-octanone | 25 | 45 | 22 | 42 | 53 |

EXAMPLE II

In order to demonstrate the criticality of conditions and ingredients of the method of the invention, comparative runs were made utilizing the apparatus and the general procedure of Example I. The test data and results are reported below in Table II.

TABLE II

| Run | AA | BB | CC | DD | EE |
|---|---|---|---|---|---|
| Ingredients, moles: | | | | | |
| DMSO | 0.705 | 0.705 | | | |
| $H_2O$ | | 0.556 | 0.556 | 0.556 | 0.556 |
| 2-chlorooctane | 0.059 | 0.059 | 0.059 | 0.059 | 0.059 |
| $NaHCO_3$ | | 0.060 | .060 | .060 | 0.060 |
| n-Butanol | | | 0.545 | | |
| n-Propanol | | | | 0.525 | |
| N,N-dimethyllauramide | | | | | 0.192 |
| Conditions: | | | | | |
| Temperature, °C | 125 | 129 | 97 | 88 | 103 |
| Reaction time, hours | 20 | 25 | 215 | 200 | 42 |
| Product yield, mole percent: | | | | | |
| Conversion | (1) | 86 | <5 | <5 | 0 |
| 2-octanone | 0 | 2 | 0 | 0 | 0 |

1 Formaldehyde polymer.

In comparing the results of Table I with those of Table II the criticality of employing the conditions and ingredients of the method as defined is readily seen.

I claim:

1. A method of preparing an alkanone comprising contacting a secondary monohalide of the formula RX where R is a secondary alkyl of from 3 to 40 carbons and X is a halogen atom selected from the group consisting of Cl, Br and I with an alkali metal fluoride in the presence of dimethyl sulfoxide at a temperature between about 25 and 140° C. utilizing a mole ratio of said dimethyl sulfoxide to said alkyl monohalide of between about 20:1 and 1:1, a mole ratio of said alkyl monohalide to said alkali metal fluoride of between about 5:1 and 1:1 and wherein water is present in said contacting in a mole ratio of said water to said dimethyl sulfoxide of less than 1:2 to form the corresponding alkanone of from 3 to 40 carbons.

2. A method in accordance with claim 1 wherein said contacting is conducted essentially in the absence of water.

3. A method in accordance with claim 1 wherein said contacting is conducted in the presence of an oxygen containing gas utilizing a mole ratio of oxygen to said alkyl halide of between about 100:1 and 1:1.

4. A method in accordance with claim 1 wherein said alkyl halide is alkyl chloride, said alkali metal fluoride is potassium fluoride, said ratio of dimethyl sulfoxide to alkyl halide is between 15:1 and 5:1, alkyl halide to alkali metal fluoride is between 2:1 and 1:1, and said temperature is between 100 and 140° C.

5. A method in accordance with claim 4 wherein said alkyl halide is 2-chlorooctane, said inorganic salt is potassium fluoride, and said alkanone is 2-octanone.

References Cited

UNITED STATES PATENTS

| | | | |
|---|---|---|---|
| 1,849,844 | 3/1932 | Lloyd | 260—593 |
| 2,658,919 | 11/1953 | Schmerling | 260—593 |
| 2,888,488 | 5/1959 | Nace | 260—599 |

OTHER REFERENCES

Nace et al., "J. Org. Chem.," vol. 24, July-Dec. (1959), pp. 1792-3.

Hunsberger et al., "Chemistry & Industry," Jan. 17, 1959, pp. 88-89.

Crown-Zellerbach, "Dimethyl Sulfoxide" (1962), pp. 15-18.

BERNARD HELFIN, Primary Examiner

W. B. LONE, Assistant Examiner